United States Patent

[11] 3,625,849

[72] Inventor Dietrich R. Rogalla
Boblingen, Germany
[21] Appl. No. 860,525
[22] Filed Sept. 24, 1969
[45] Patented Dec. 7, 1971
[73] Assignee International Business Machines Corporation
Armonk, N.Y.
[32] Priority Oct. 2, 1968
[33] Germany
[31] P 18 00 523.7

[54] MANUFACTURE OF MAGNETIC MEDIUM
5 Claims, 2 Drawing Figs.

[52] U.S. Cl. .......... 204/192, 117/234, 117/237, 117/240, 204/37
[51] Int. Cl. .......... C23c 15/00
[50] Field of Search .......... 204/192; 117/237, 234, 240

[56] References Cited

UNITED STATES PATENTS

| | | | |
|---|---|---|---|
| 2,900,282 | 8/1959 | Rubens .......... | 117/237 |
| 3,202,538 | 8/1965 | Beynon .......... | 117/237 |
| 3,396,047 | 8/1968 | Prosen .......... | 117/237 |
| 3,516,860 | 6/1970 | Simmons .......... | 117/237 |
| 3,433,721 | 3/1969 | Wolf .......... | 204/192 |
| 3,475,309 | 10/1969 | Brook et al. .......... | 204/192 |
| 3,480,922 | 11/1969 | Flur et al. .......... | 204/192 |

*Primary Examiner*—John H. Mack
*Assistant Examiner*—Sidney S. Kanter
*Attorneys*—Hanifin and Jancin and Nathan N. Kallman

ABSTRACT: To make a magnetic record medium having high coercivity and low magnetostriction, an alloy consisting of a magnetic component and nonmagnetic component in a solid solution is applied by cathode sputtering to a nonmagnetic carrier, which is supported by a holder maintained at room temperature. The applied coating is heated at a temperature greater than 200° C. for more than 1 hour within an inert gas atmosphere, the assembly being annealed at a temperature of approximately 600° C.

INVENTOR.
DIETRICH R. ROGALLA

BY Nathan N. Kallman
ATTORNEY

MANUFACTURE OF MAGNETIC MEDIUM

BACKGROUND OF THE INVENTION

1. Field of the Invention

This invention relates to a method for making a recording disk having a thin magnetic layer characterized by low magnetostriction and high-coercive force.

2. Description of the Prior Art

To achieve high bit density recording in magnetic storage systems, it is desirable to use very thin, homogenous magnetic recording layers, characterized by high coercivity. Thin magnetic layers of this type can be made by depositing pure cobalt in a nonmagnetic carrier or substrate, by way of example, by means of cathode sputtering of vapor deposition. However, such thin cobalt exhibit high magnetostriction, so that mechanical shocks and tension tend to change the coercive force and the direction of magnetization of a magnetic recording. In such event, data which has been magnetically recorded on a magnetic disk, coated with thin layers of pure cobalt, can be lost whenever the record disk experiences an impact or sharp blow. It is known that in order to avoid the problem of high magnetostriction of a magnetic material, the material may be made from a two-phase alloy. The prior art technique for obtaining a two-phase magnetic is by drawing the material in the form of wires, which provides to the magnetic component of the alloy a magnetic anisotropy having low magnetostriction. However, wire drawing or rolling cannot be employed for the production of magnetic recording disks, which are used extensively in high-density storage files.

SUMMARY OF THE INVENTION

An object of this invention is to provide a novel method for making a record medium having a thin magnetic layer enabling high-density recording, such layer being characterized by low magnetostriction and high coercivity.

In keeping with this invention, a method for forming a thin magnetic recording layer comprises the steps of coating a nonmagnetic carrier or substrate with an alloy in solid solution comprising a magnetic component such as cobalt, and a nonmagnetic component, such as copper. The coating is applied by electroplating, vacuum deposition, or cathode sputtering, while the holder to the substrate is maintained at room temperature, and the substrate surface itself is at a temperature greater than room temperature by 100°–200° C. The coating is deposited to a thickness which is less than 10,000 Angstroms, and the assembly is heated at a temperature greater than 200° C. for more than 1 hour in a chemically inert gas atmosphere, such as argon. Thereafter, the assembly is annealed at a temperature of approximately 600° C. to obtain a two-phase magnetic structure.

BRIEF DESCRIPTION OF THE DRAWING

The invention will be described in greater detail with reference to the drawing in which.

DESCRIPTION OF THE PREFERRED EMBODIMENT

To accomplish the teachings of this invention, an alloy having a magnetic component, such as cobalt, and a nonmagnetic component, such as copper, in solid solution is coated onto a nonmagnetic substrate, which may be an optically flat and smooth glass disk. In a preferred embodiment, the cobalt constitutes 25–50 percent of the cobalt copper alloy, by weight. The cobalt-copper film is deposited by cathode sputtering onto a water-cooled glass substrate, which is secured in a holder that is maintained at room temperature. The film is deposited by sputtering at a rate of 5–10 Angstroms per second, until the film reaches a thickness of about 2,000 Angstroms.

The next step comprises heating the coated assembly in an atmosphere of argon at a temperature of about 500° C. for more than 1 hour. Anisotropic magnetic single domain particles are formed, the magnetic particles being uniformly distributed with the nonmagnetic particles across the entire layer.

The composition or the material is annealed at a temperature between 500°–600° C., and the decomposition of the monophase alloy occurs. The cobalt magnetic single domain particles which are formed grow to multidomain particles. As a result, the single phase cobalt-copper alloy ceases to exist after a length of several hours. Once the single-phase condition disappears, then growth of the multidomain particles only occurs.

Figure 1:
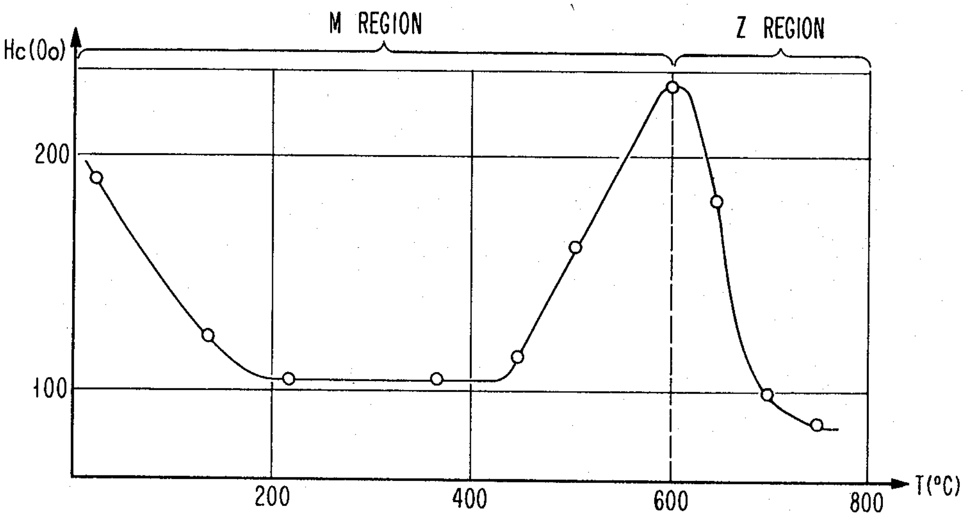
FIG. 1 is a graphic representation depicting the magnetic coercive force $H_c$ plotted against temperature in degrees centigrade.

FIG. 1 illustrates the states and the magnetic properties of a cobalt-copper alloy-containing 50 weight percent cobalt, depending on the annealing temperature. These alloy films were sputtered onto quartz glass substrates at a sputter rate of 5 Angstroms per second. The representation indicates that the coercive force $H_c$ of the thin alloy layer reaches a maximum value at a temperature of 600° C. At this temperature, the alloy has changed its crystalline structure. Below the temperature of 600° C., the M region of the alloy consists mostly of a single metastable mixed phase of the magnetic and nonmagnetic components. Above the temperature of 600° C., in the Z region, the alloy reaches a desired stable two-phase state. A crystal structure is obtained in which magnetic one-domain particles are formed. This structure is formed only in those cases where the two components of the alloy crystallize simultaneously.

The form and/or crystal anisotropy of the formed two-phase alloy have the effect that the alloy material exhibits low magnetostriction. For that reason, the alloy is highly suitable for disk-shaped magnetic record carriers which can be exposed to blows and shocks caused by mechanical vibrations and head crashes of the write-read head. When such vibrations occur, the low magnetostriction of the alloy material prevents the erasure of the magnetic recording.

Figure 2:
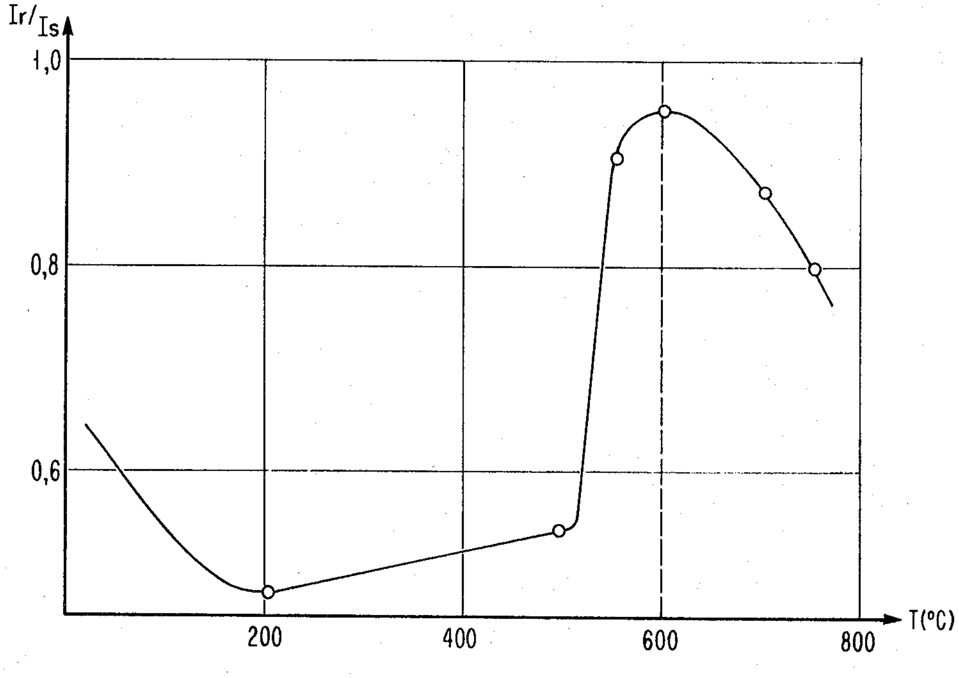
FIG. 2 is a graphic representation illustrating the remanent magnetization $I_r$ and saturation magnetization $I_s$ over a given temperature range.

FIG. 2 shown the representation of the values of remanence magnetization/saturation magnetization $I_r/I_s$ depending on the annealing temperature T. The curve display shows that at a temperature of 600° C., at which the above-mentioned two-phase state of the alloy is generated, these values reach a maximum value. As this value almost reaches the value of 1.0, the magnetization curve of the alloy shows a very good rectangular ratio, so that a high density can be obtained for the magnetic recording.

It should be understood that other combinations of magnetic and nonmagnetic components than cobalt-copper may be employed to provide a thin magnetic recording layer. For example, alloys of cobalt-gold, iron-gold, iron-copper, and nickel-gold may be used. Also, the heating temperatures and periods may vary according to the material used, film thickness, and sputter rate, among other things. In a preferred embodiment, a cobalt-copper alloy film of about 2,000 Angstroms thickness sputtered at a rate of 5–10 Angstroms per second was found to yield very good results. Improved results were also found when the magnetic component was less than or equal to 50 percent of the solid solution of alloy by volume.

While the invention has been particularly shown and described with reference to a preferred embodiment thereof, it will be understood by those skilled in the art that various changes in the form and details may be made therein without departing from the spirit and scope of the invention.

What is claimed is:

1. A method for making a magnetic layer with low magnetostriction and high-coercive force for magnetic record carriers from a magnetic material consisting of a stable multiphase alloy with magnetic and nonmagnetic components, comprising the steps of:

coating such alloy of magnetic and nonmagnetic components onto a nonmagnetic carrier, in a monophase homogeneous layer having a thickness less than 10,000 Angstroms;

heating such coated material in an atmosphere of an inert gas medium at a temperature greater than 200° C. for more than 1 hour to form a structure of anisotropic one-domain particles, and annealing the coated material comprising anisotropic one-domain particles at a temperature of substantially at least 600° C. to obtain a two-phase magnetic structure.

2. A method as in claim 1, wherein the coating step is accomplished by means of cathode sputtering.

3. A method as in claim 1, wherein the step of heating is accomplished at a temperature between 500°–600° C. for approximately 2¼ hours.

4. A method as in claim 1, wherein the magnetic component of the alloy is less than or equal to 50 percent by volume.

5. A method as in claim 1, wherein the alloy is taken from the group consisting of cobalt-copper, cobalt-gold, iron-copper, iron-gold, and nickel-gold.

* * * * *